United States Patent [19]

Sauer et al.

[11] Patent Number: 4,690,874

[45] Date of Patent: Sep. 1, 1987

[54] MOLDED CONSTRUCTION ELEMENT

[75] Inventors: Claude Sauer, Aix-en-Provence; Raymond Burger, Sainte-Marie-Au; Gabriel Reguigne, Blois; Mark Kern, Paris, all of France

[73] Assignee: Tourisme Hotellerie Ltd., Chypre, Switzerland

[21] Appl. No.: 793,114

[22] Filed: Oct. 30, 1985

[30] Foreign Application Priority Data

| | | | |
|---|---|---|---|
| Apr. 25, 1984 | [FR] | France | 84 006507 |
| May 4, 1984 | [FR] | France | 84 07004 |
| May 4, 1984 | [FR] | France | 84 07005 |

[51] Int. Cl.[4] .......................... B32B 21/04; B24D 3/02

[52] U.S. Cl. .............................. 428/537.1; 52/309.12; 52/309.14; 52/DIG. 9

[58] Field of Search ......... 52/DIG. 9, 309.14, 309.12; 428/537.1

[56] References Cited

U.S. PATENT DOCUMENTS

| | | | |
|---|---|---|---|
| 1,420,220 | 6/1922 | Roux | 52/DIG. 9 |
| 1,949,692 | 3/1934 | Pavesi | 52/DIG. 9 |
| 3,995,003 | 11/1976 | Potter et al. | 264/122 |
| 4,364,979 | 12/1982 | Dutton | 428/2 |

FOREIGN PATENT DOCUMENTS

| | | | |
|---|---|---|---|
| 2736991 | 2/1979 | Fed. Rep. of Germany . | |
| 2850458 | 7/1979 | Fed. Rep. of Germany . | |
| 743754 | 4/1933 | France | 7/1 |
| 0164141 | 12/1980 | Japan . | |
| 2084212 | 4/1982 | United Kingdom . | |

*Primary Examiner*—John E. Kittle
*Assistant Examiner*—Patrick J. Ryan
*Attorney, Agent, or Firm*—Anthony A. O'Brien

[57] ABSTRACT

A panel has a layer (1) of stems of reeds molded together with an appropriate glue. It includes a layer (2) formed of particles of reeds also molded together with glue. The layers (1 and 2) can be separated by a water repellant sheet (3) to permit, for example, the making of watertight roofs.

2 Claims, 2 Drawing Figures

MOLDED CONSTRUCTION ELEMENT

To date, stems of reeds have been used only in two ways:

(1) interlaced between one another in the form of mats, after having been flattened or split;

(2) aligned, possibly in several rows of thickness, and connected together with a wire or thread of textile material.

These two methods make it possible to obtain panels exhibiting a certain decorative advantage, but they offer neither the airtightness necessary for good thermal insulation nor a bending strength, that make it possible to use the material as a structuring element for construction.

Panels of leaves of reeds buried in plaster have also been made.

This invention has as its object a new construction element, characterized in that it consists of a molding of a mixture of reed stems, and/or of particles of crushed reeds, and of glue or synthetic resin.

Until now, it has not been possible satisfactorily to glue reeds whose walls are very rigid, for example the Phragmita Communis reeds, because they exhibit a very hard silicoceraceous epidermis to which the glue has only a very slight adherence.

The invention also relates to a manufacturing process which makes it possible to make said element. This process is characterized in that reed stems are processed to score them before gluing them. According to an advantageous embodiment of the process, reeds are placed in a rotary drum so that the stems roll over one another, which rids them of their leaves, while the siliceous particles of the leaves score the naturally varnished epidermis of the stems.

The reeds can also be processed with a hammer mill to obtain particles whose epidermis then exhibits marks improving the adherence of the glue to the walls. The particles or stems of reeds can be coated with glue by dipping or by spraying, the glue being able to have a base of polyurethane, polyester, isocyanate or of the melamine-urea-formaldehyde or phenolic type. The amount of glue can be less than 150 kg per $m^3$ of finished product.

The accompanying drawing shows, by way of example, a panel made with the material that is the object of the invention.

Figure 1:
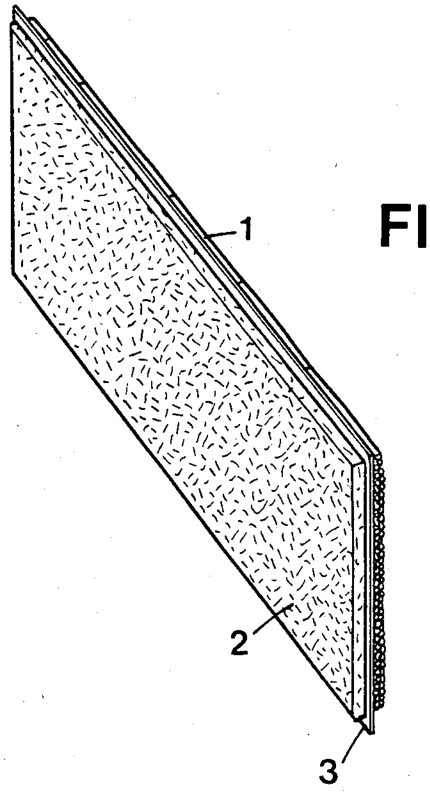
FIG. 1 is a view in perspective showing a face of this panel.
Figure 2:
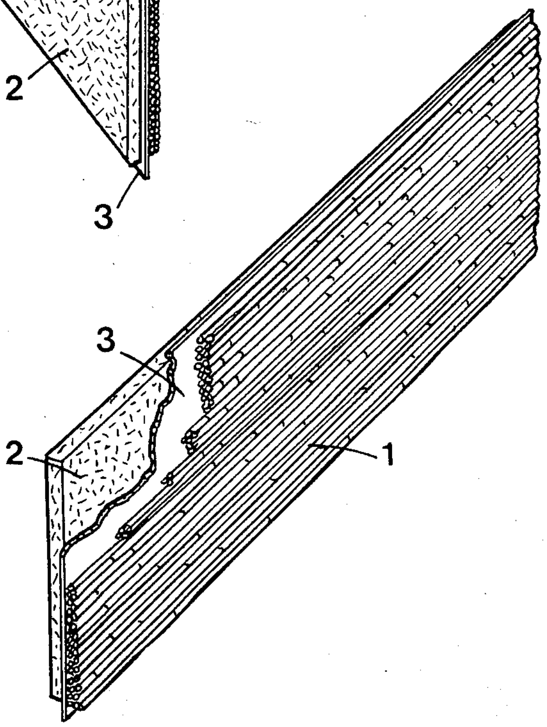
FIG. 2 is a view in perspective showing its other face, a part of the panel being torn sway.

To make the panel shown, reeds are used that have been processed by a drum, for example toothed, to tear off the leaves and keep only the stems. This processing is advantageous because it leaves marks, for example in the form of scorings, in the surface of the stems, which makes it possible to make a panel using a self-adhering paste, the adherence of the paste being very good thanks to the marks or scratches. This point is very important because certain types of reeds, particularly the Phragmita Communis reeds, exhibit a very hard silicoceraceous epidermis which does not make it possible to obtain effective gluings of these reeds.

The panel shown consists of two layers, a first layer 1 and a second layer 2, separated from one another by a sheet 3 of water-repellent material, which makes it possible particularly to use this panel for the outside walls of dwellings or for covering them.

The first layer 1 is made by stems of reeds processed whole, arranged at the bottom of the mold and mixed with a glue which can be of the melamine-uera-formaldehyde or phenolic type, or any other type of glue that can exhibit resistance to moisture, heat and aging. Very good results have also been obtained by using a self-adhering paste with an isocyanate base.

Then, water-repellent sheet 3 is placed on this first layer, then the material forming the second layer 2 is put in the mold. The mold is closed for the time necessary for the setting of the glue or self-adhering paste.

The second layer 2 is made of reed particles obtained as previously described and glued with the same type of glue as layer 1. Preferably, this layer 2 is made of 20 to 50% Phragmita Communis reeds and 50 to 80% Papirus Cholan reeds.

Thanks to the rigidity of the resulting panel, it is self-supporting and can be used as a structural element in buildings, as wall panel or outside wall panel or further as roofing. It is clear that if it is desired to obtain a rigid panel whose two faces are smooth, there could be a central layer corresponding to layer 1 and coated on each of its faces with a layer of the same nature as layer 2 previously described.

It is advantageous to use hollow stems of reeds because, thanks to the inside cavity of these stems, the new material obtained exhibits a low density which is generally between 0.1 and 0.4.

Of course, panels of various sizes can be made and tests have shown that slabs 2.5 m×1.25 m, whose thickness can be between 2 and 60 mm, can certainly be made.

It is clear that the mold can also be filled in the reverse direction, i.e., by first placing on its bottom the glued particles of layer 2, then sheet 3, for example of a bituminous nature, and finally by placing the reed stems parallel to one another to form layer 1. The stems can be coated with glue before or after they are put in place.

Depending on the anticipated use, water-repellent sheet 3 is not necessary and can therefore be omitted. Also, it is possible to get by with a panel consisting of the single layer 1 (arranged reed stems).

Similarly, construction elements of various shapes can be made, for example in the shape of a beam with the stems arranged in the lengthwise direction of the beam, or further in the shape of a frame, for example for doors or windows. These beams have mechanical characteristics making it possible to support roofings, accessible balconies or floors.

Moreover, it is also possible to get by with the single layer 2 (with a base of crushed particles of reed stems) which, depending on the mixtures, the pressures and temperatures applied, makes it possible to obtain all types of panels that can be used as inside walls, decorative facing or furniture.

In any case, the resulting element is very advantageous, because the raw material is inexpensive, particularly in the swampy regions where the reeds grow abundantly and can be gathered with reapers. These elements exhibit an excellent thermal insulation capacity and a good strength and the self-adhering mass can be combined with products for protection against fire and mildew-inhibiting agents and/or fungicides.

Finally, since for layer 1 reeds whose epidermis exhibits naturally a varnished appearance are used, the process gives the esthetic appearance of thatch and an excellent durability to the unit, which is favorable for making covering elements for dwellings.

We claim:

1. A process of forming an external and internal structural building component comprising:

selecting a supply of Phragmites Communis reeds, placing said supply of siad reeds inside a rotating drum to roll said reeds over one another for stripping the leaves from said reeds to obtain a plurality of reed stems, and scoring the epidermis of said reed stems within said drum by rotating said reed stems in contact with siliceous particles of the leaves that are stripped from said reeds;

forming a first layer having opposite sides of said plurality of reed stems that have a second epidermis;

providing an intermediate layer of said building component having opposite sides including a sheet of fluid-tight material;

providing a third layer of said building component from a supply of reed particles, said reed particles being processed from 20 to 50 percent Phragmites Communis reed stems and 50 to 80 percent of reed stems of another variety of reeds having a softer epidermis than the epidermis of said Phragmites Communis reeds; and bonding said first layer of reed stems to one of said sides of said intermediate layer and to one another such that one of said sides of said first layer is exposed with said reed stems facing outwardly and the other of said sides of said first layer is adjacent said intermediate layer with a glud consisting of an isocyanate base, and bonding said reed particles of said third layer together and to the other of said sides of said intermediate layer with a glue consisting of an isocyanate base.

2. A structural component product made according to the process of claim 1.

* * * * *